United States Patent
Aonuma

(10) Patent No.: US 9,697,417 B2
(45) Date of Patent: Jul. 4, 2017

(54) EXERCISE SUPPORT SYSTEM, EXERCISE SUPPORT APPARATUS, AND EXERCISE SUPPORT METHOD

(71) Applicant: SEIKO EPSON CORPORATION, Tokyo (JP)

(72) Inventor: Masashi Aonuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 332 days.

(21) Appl. No.: 14/603,933

(22) Filed: Jan. 23, 2015

(65) Prior Publication Data

US 2015/0227652 A1  Aug. 13, 2015

(30) Foreign Application Priority Data

Feb. 7, 2014  (JP) ................. 2014-022587

(51) Int. Cl.
*G06K 9/00* (2006.01)

(52) U.S. Cl.
CPC ..... *G06K 9/00342* (2013.01); *G06K 9/00214* (2013.01)

(58) Field of Classification Search
None
See application file for complete search history.

(56) References Cited

U.S. PATENT DOCUMENTS

| | | | |
|---|---|---|---|
| 7,257,237 B1 * | 8/2007 | Luck | A61B 5/1113 382/103 |
| 7,519,210 B2 * | 4/2009 | Hirsch | A61B 5/0059 378/41 |
| 7,702,140 B2 * | 4/2010 | Hirsch | A61B 5/0059 378/41 |
| 7,804,998 B2 * | 9/2010 | Mundermann | G06K 9/00342 382/154 |
| 8,023,726 B2 * | 9/2011 | Sundaresan | G06K 9/00342 345/604 |
| 8,144,148 B2 * | 3/2012 | El Dokor | G06F 3/011 345/158 |
| 8,396,252 B2 * | 3/2013 | El Dokor | G06F 3/017 382/106 |
| 8,432,390 B2 * | 4/2013 | Givon | G06K 9/00369 345/418 |

(Continued)

FOREIGN PATENT DOCUMENTS

JP  2001-239054 A  9/2001

*Primary Examiner* — Feng Niu
(74) *Attorney, Agent, or Firm* — Global IP Counselors, LLP

(57) ABSTRACT

An exercise support system includes a plurality of imaging devices, a 3D generation section, an evaluation reference memory, and an evaluation section. The imaging devices are configured to capture videos for movements of a person to be evaluated. The 3D generation section is configured to generate 3D model data of the person to be evaluated based on the video captured by each of the imaging devices. The evaluation reference memory is configured to store reference 3D model data that is 3D model data to become an evaluation reference of an exercise. The evaluation section is configured to evaluate the movements of the person to be evaluated by comparing between the reference 3D model data and the 3D model data generated by the 3D generation section in each body part of the person to be evaluated.

8 Claims, 6 Drawing Sheets

(56) References Cited

U.S. PATENT DOCUMENTS

| | | | | |
|---|---|---|---|---|
| 8,625,855 B2* | 1/2014 | El Dokor | ................ | G06F 3/017 |
| | | | | 382/106 |
| 8,696,450 B2* | 4/2014 | Rose | ................ | G09B 19/0038 |
| | | | | 463/30 |
| 8,744,121 B2* | 6/2014 | Polzin | ................ | A63F 13/213 |
| | | | | 382/103 |
| 8,786,680 B2* | 7/2014 | Shiratori | ................ | G06F 3/011 |
| | | | | 345/156 |
| 9,025,824 B2* | 5/2015 | Stephenson | ........ | A63B 24/0003 |
| | | | | 348/135 |
| 9,152,853 B2* | 10/2015 | El Dokor | ................ | G06F 3/017 |
| 9,272,202 B2* | 3/2016 | El Dokor | ................ | G06F 3/011 |
| 9,355,305 B2* | 5/2016 | Tanabiki | ................ | G06T 7/75 |
| 9,417,700 B2* | 8/2016 | El Dokor | ................ | G06F 3/017 |
| 9,424,461 B1* | 8/2016 | Yuan | ................ | G06K 9/00201 |
| 2007/0110293 A1* | 5/2007 | Arnon | ................ | A61B 5/015 |
| | | | | 382/128 |
| 2009/0232353 A1* | 9/2009 | Sundaresan | ........ | G06K 9/00342 |
| | | | | 382/103 |
| 2010/0172567 A1* | 7/2010 | Prokoski | ................ | A61B 5/0064 |
| | | | | 382/132 |
| 2014/0147820 A1* | 5/2014 | Snow | ................ | G06F 19/3481 |
| | | | | 434/247 |
| 2014/0228123 A1* | 8/2014 | Polzin | ................ | A63F 13/213 |
| | | | | 463/36 |
| 2014/0285517 A1* | 9/2014 | Park | ................ | G06T 11/60 |
| | | | | 345/632 |
| 2015/0231444 A1* | 8/2015 | Stephenson | ........ | A63B 24/0003 |
| | | | | 700/92 |
| 2017/0004621 A1* | 1/2017 | Maranzana | ............. | G06F 17/50 |

* cited by examiner

One scene of video based on 3D model data of user

One scene of video based on reference 3D model data

EXERCISE SUPPORT SYSTEM, EXERCISE SUPPORT APPARATUS, AND EXERCISE SUPPORT METHOD

CROSS-REFERENCE TO RELATED APPLICATIONS

This application claims priority to Japanese Patent Application No. 2014-022587 filed on Feb. 7, 2014. The entire disclosure of Japanese Patent Application No. 2014-022587 is hereby incorporated herein by reference.

BACKGROUND

Technical Field

The present invention relates to an exercise support system, an exercise support apparatus, and an exercise support method for evaluating movements of a person to be evaluated.

Related Art

Japanese Laid-open Patent Application Publication No. 2001-239054 discloses an example that a system generates an evaluation by comparing between reference movements, which become a sample, and movements of a person to be evaluated. In the system, a plurality of sensors that detects the movements of the person to be evaluated in a dance area in a noncontact manner is provided surrounding the dance area, and each sensor is set such that the detection regions are not overlapped to each other.

In this system, when a body part (e.g., right hand) of the person to be evaluated crosses the detection region of any sensor, the output signal from the sensor is changed. An evaluation is generated by comparing between the timing in which the output signal from the sensor is changed and the ideal timing in which the output signal from the sensor is changed when the person to be evaluated faithfully performs the aforementioned reference movements.

In the aforementioned system, when a body part of the person to be evaluated crosses the detection region of any sensor, the output signal from the sensor is changed. However, it cannot specify which body part crosses the detection region. Therefore, it is difficult to generate an appropriate evaluation for the movements of the person to be evaluated.

SUMMARY

An object of the present invention is to provide an exercise support system, an exercise support apparatus, and an exercise support method that can enhance the evaluation accuracy for movements of a person to be evaluated.

An exercise support system to attain the aforementioned object includes a plurality of imaging devices configured to capture videos for movements of a person to be evaluated; a 3D generation section configured to generate 3D model data of the person to be evaluated based on the video captured by each of the imaging devices; an evaluation reference memory configured to store reference 3D model data that is 3D model data to become an evaluation reference of an exercise; and an evaluation section configured to evaluate the movements of the person to be evaluated by comparing between the reference 3D model data and the 3D model data generated by the 3D generation section in each body part of the person to be evaluated.

According to the aforementioned structure, the 3D model data of the person to be evaluated is generated by capturing videos for the movements of the person to be evaluated by the plurality of imaging devices. A comparison between the 3D model data and the reference 3D model data in each body part (hand or leg) is performed so that the processing "evaluation for the movements of the person to be evaluated" in which the evaluation reference, that is, the reference movements as to be a sample is standardized can be performed. Accordingly, it is possible to appropriately evaluate whether the movements in any body part of the person to be evaluated are different from the sample. Therefore, the evaluation accuracy for the movements of the person to be evaluated can be enhanced.

The aforementioned exercise support system can include a part information acquisition section configured to acquire information related to the body part of the person to be evaluated in each part based on the 3D model data generated by the 3D generation section; and a reference 3D correction section configured to approximate a reference body shape to a body shape of the person to be evaluated based on each body part of the information acquired by the part information acquisition section and correct the reference 3D model data to data based on the reference body shape. In this case, the evaluation section preferably is configured to evaluate the movements of the person to be evaluated by comparing between the reference 3D model data corrected by the reference 3D correction section and the 3D model data generated by the 3D generation section in each body part of the person to be evaluated.

According to the aforementioned structure, the reference body shape approximates to the body shape of the person to be evaluated, and the reference 3D model data based on the reference body shape is generated. By employing such reference 3D model data as an evaluation reference, the variability of the evaluation accuracy caused by the difference between the body shape of the person to be evaluated and the reference body shape can be suppressed and therefore, the evaluation accuracy for the movements of the person to be evaluated can be enhanced.

It is preferable that the aforementioned exercise support system further includes a guide section configured to guide the movements of the person to be evaluated such that the movements of the person to be evaluated approximates movements of an evaluation reference shown by the reference 3D model data based on an evaluation result of the evaluation section after an evaluation has been completed by the evaluation section. With such structure, by providing such guide to the person to be evaluated, the exercise performed by the person to be evaluated can be appropriately supported to approximate to the movements as a sample.

The aforementioned exercise support system preferably includes a display control section configured to display movements of the evaluation reference shown by the reference 3D model data and the movements of the person to be evaluated shown by the 3D model data generated by the 3D generation section on a display screen. With such structure, the deviation between the movements of the person to be evaluated and the reference movements that are an evaluation reference can be viewed by the person to be evaluated.

In the aforementioned exercise support system, the display control section configured to overlap and display the movements of the evaluation reference shown by the reference 3D model data and the movements of the person to be evaluated shown by the 3D model data generated by the 3D generation section on the display screen. With such structure, by overlapping and displaying the movements of the evaluation reference and the movements of the person to be evaluated on the display screen, it can clarify which body part of the person to be evaluated is different from the sample.

The aforementioned exercise support system preferably includes a history memory section configured to store the evaluation result of the evaluation section as an evaluation history; and a notification section configured to extract a point in which a difference between a movement by the person to be evaluated and a movement of the evaluation reference shown by the reference 3D model data is easily made based on the evaluation history stored in the history memory section, and notify the extracted point before the movements by the person to be evaluated are started or while the movements are performed by the person to be evaluated. With such structure, a point in which the person to be evaluated easily makes mistake can be notified to the person to be evaluated before the person to be evaluated starts performing the movements or while performing the movements. Therefore, the exercise of the person to be evaluated can be appropriately supported.

In the aforementioned exercise support system, the evaluation section is configured to evaluate at least one of a delay movement of the person to be evaluated with respect to movements of the evaluation reference and a difference between a movement quantity of a part as the evaluation reference and a movement quantity of a part of the person to be evaluated.

Also, the exercise support apparatus to attain the aforementioned object includes a 3D generation section configured to generate 3D model data of a person to be evaluated based on videos captured by a plurality of imaging devices configured to capture the videos for movements of the person to be evaluated; an evaluation reference memory configured to store reference 3D model data that is 3D model data to become an evaluation reference of an exercise; and an evaluation section configured to evaluate the movements of the person to be evaluated by comparing the reference 3D model data and the 3D model data generated by the 3D generation section in each body part of the person to be evaluated. With such structure, the functions and effects similar to the aforementioned exercise support system can be obtained.

An exercise support method to attain the aforementioned object includes capturing videos for movements of a person to be evaluated by a plurality of imaging devices and generating 3D model data of the person to be evaluated based on the video captured by each of the imaging devices; and evaluating the movements of the person to be evaluated by comparing reference 3D model data that is 3D model data to become an evaluation reference of an exercise and the 3D model data that is generated in each body part of the person to be evaluated. With such structure, the functions and effects similar to the aforementioned exercise support system can be obtained.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, one embodiment of an exercise support system will be described in reference to FIG. 1 to FIG. 7.

Figure 1:
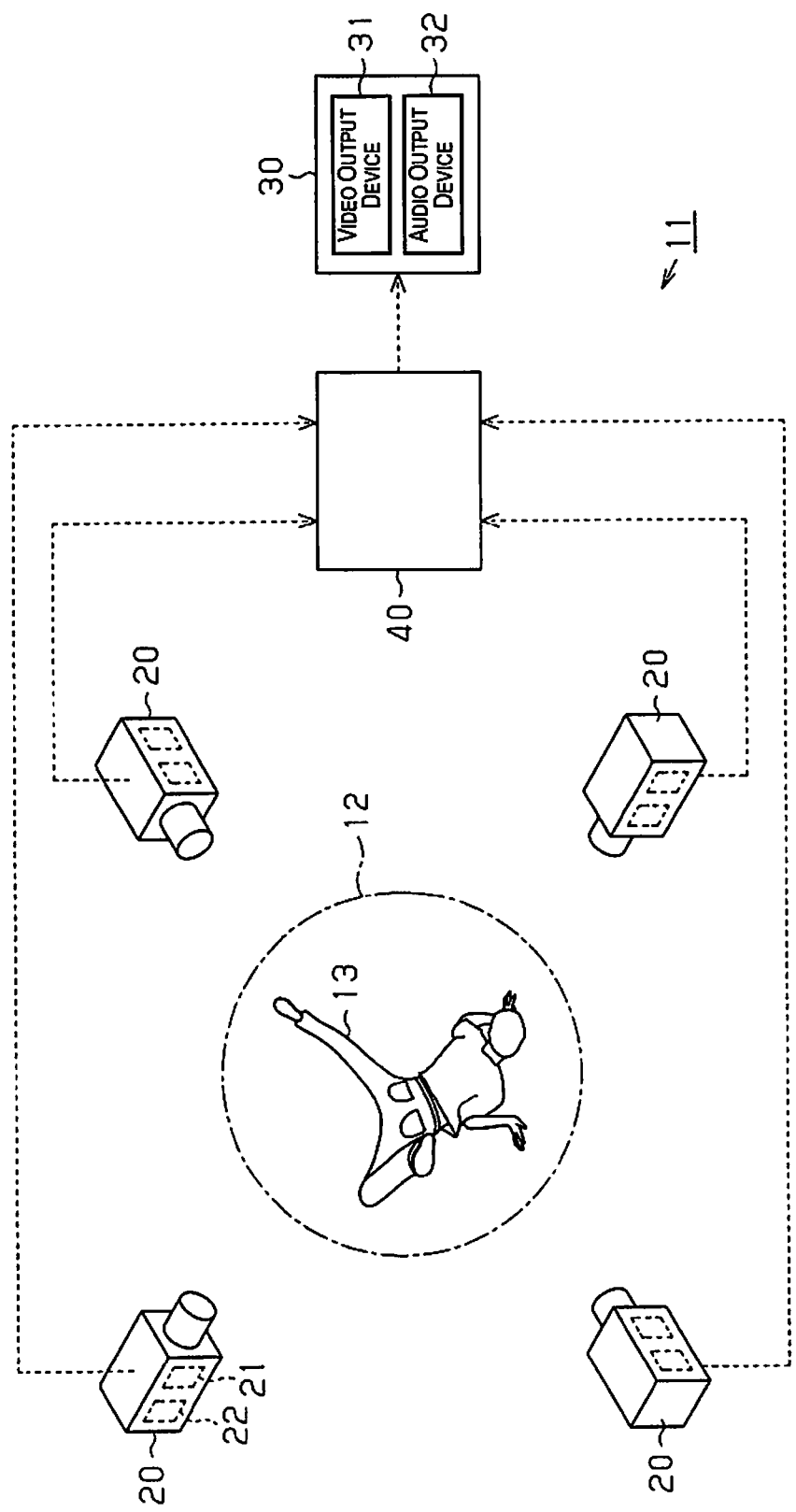
FIG. 1 is a schematic configuration showing one embodiment of an exercise support system.

As shown in FIG. 1, an exercise support system 11 of the present embodiment is provided with a plurality of imaging devices 20 that captures videos of movements of the user 13 who is a person to be evaluated in a predetermined exercise region 12, an exercise support apparatus 40 that evaluates the exercise of the user, and an output device 30 that is controlled by the exercise support apparatus 40.

The imaging devices 20 are arranged surrounding the user 13 positioned within the exercise region 12. These imaging devices 20 have a RGB camera 21 and a depth sensor 22. When the imaging devices 20 take videos of the user within the exercise region 12 by the RGB camera 21, a distance from the imaging devices 20 to the user who is an object, a depth of the user, etc. can be measured by the depth sensor 22. The imaging devices 20 send the result of the videos taken by the RGB camera 21, and the video information including the information measured by the depth sensor 22 to the exercise support apparatus 40. In the exercise support apparatus 40, the 3D model data that is the three-dimensional video data of the user 13 processed by the well-known method is generated based on the video information from each imaging device 20.

Here, the phrase "3D model data" denotes the data of three-dimensional stereoscopic video. When videos (including moving images, still images) based on the 3D model data are displayed in a display device, etc., a video viewed from a direction desired by the user can be displayed in the display device.

The output device 30 is provided with a video output device 31 in which videos such as moving images are displayed, and an audio output device 32 such as a speaker that outputs voices. For example, the video output device 31 includes a projector that projects videos on a screen, etc., a head mount display capable of mounting by the user 13, and a monitor arranged in a predetermined position.

In this exercise support system 11, a dance (an example of movements) performed by the user 13 in the exercise region 12 is taken by the imaging devices 20. Then, each body part (right arm, left arm, right foot, left foot, etc.) of the user 13 is evaluated based on a reference dance that is the dance as an evaluation reference, which is preliminary registered in the exercise support apparatus 40. In addition, in the present embodiment, the plurality of imaging devices 20 takes videos for the dance performed by the user 13 so that it is possible to evaluate the dance performed by the user 13 based on the views in the various directions. After the dance performed by the user 13 was completed, the evaluation result for the dance performed by the user 13 is outputted (displayed) in the video output device 31.

Figure 3A:
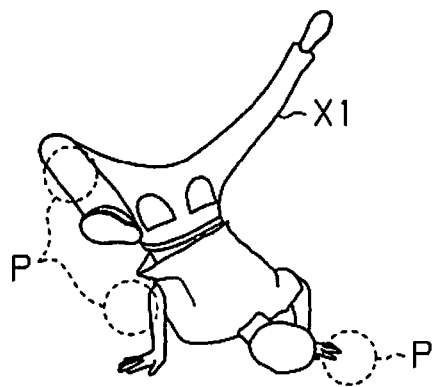
FIG. 3A is a diagram showing one scene of a video based on 3D model data of the user.
Figure 3B:
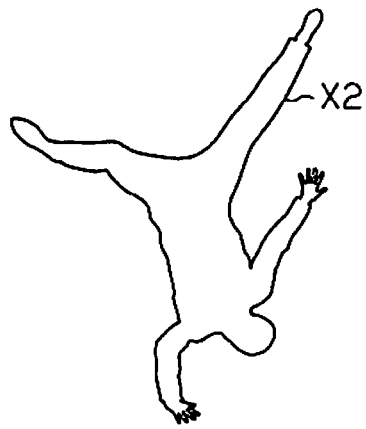
FIG. 3B is a diagram showing one scene of a video based on reference 3D model data.
Figure 4:
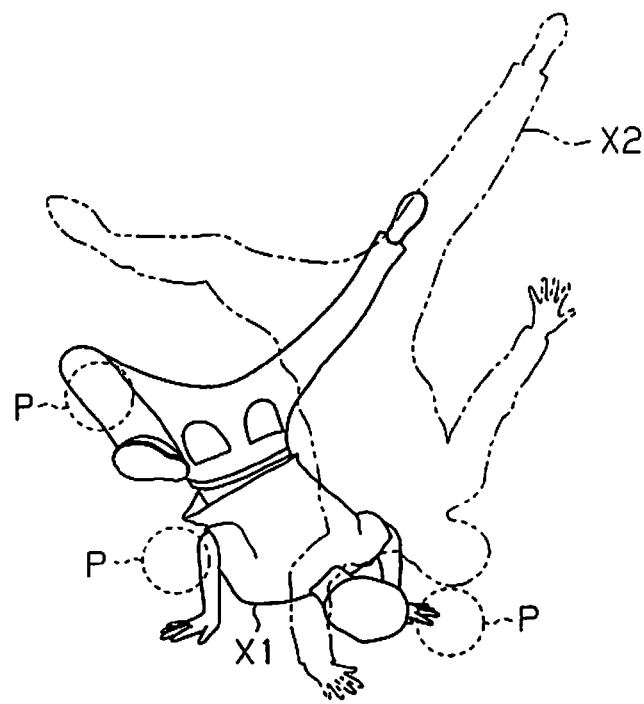
FIG. 4 is a diagram showing a display condition that overlaps two videos.

Next, the exercise support apparatus 40 will be described in reference to FIG. 2 to FIG. 4.

Figure 2A:
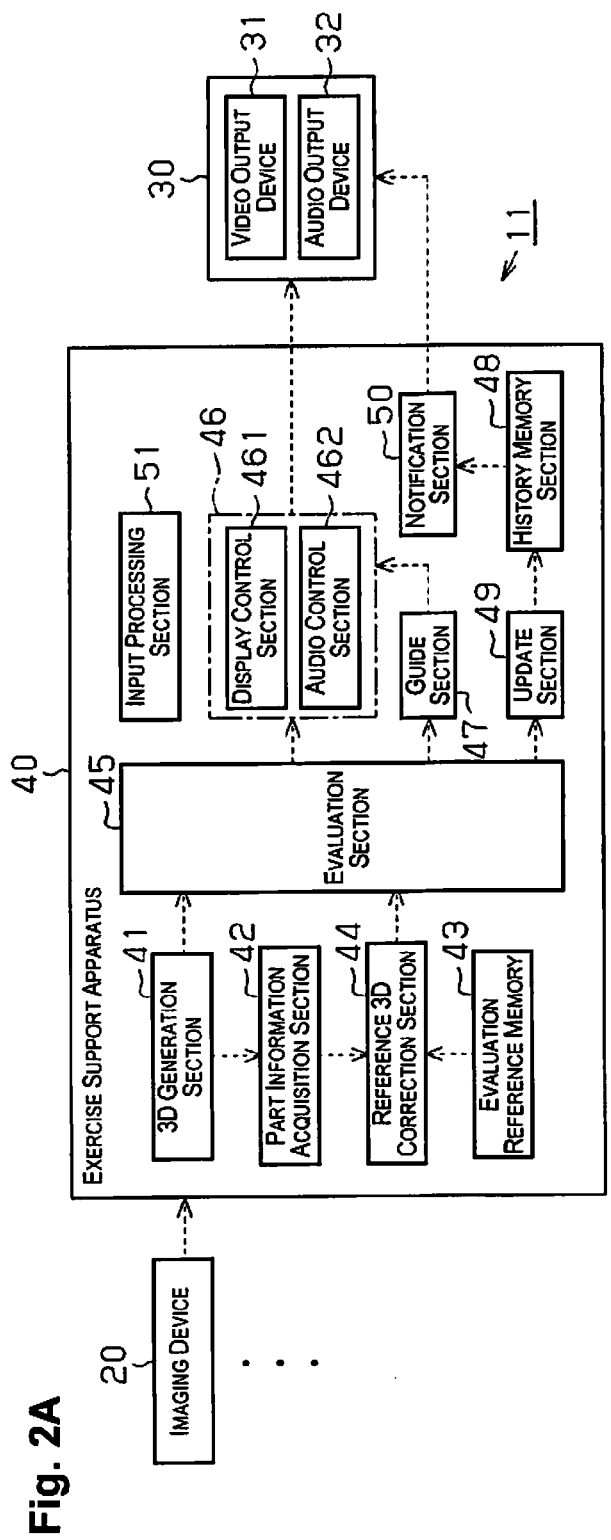
FIG. 2A is a block diagram showing a function configuration of an exercise support apparatus.

As shown in FIG. 2A, the exercise support apparatus 40 is provided with a microcomputer that is configured by a CPU, a ROM, a RAM, etc. As an operation part, the exercise support apparatus 40 includes a 3D generation section 41, a part information acquisition section 42, an evaluation reference memory 43, a reference 3D correction section 44, an evaluation section 45, an output control section 46, a guide section 47, a history memory section 48, an update section 49, a notification section 50, and an input processing section 51.

The 3D generation section 41 generates 3D model data that is the three-dimensional video data of the movements of the user 13 based on the video taken by each imaging device 20. At this point, the 3D generation section 41 generates the 3D model data of a moving object (including the user 13 who is an evaluation target) that seems to be the movements in the videos taken by the imaging devices 20. Therefore, the 3D generation section 41 generates not only the 3D model data of the user 13, who is the evaluation target, but also the 3D model data of the moving object other than the user 13. When the 3D model data of the plurality of moving objects is generated in such way, the 3D generation section 41 selects the 3D model data of the user 13, and the 3D generation section 41 outputs the selected 3D model data of the user 13 to the part information acquisition section 42 and the evaluation section 45.

The part information acquisition section 42 acquires information related to each body part of the user 13 by analyzing the 3D model data of the user 13 generated in the 3D generation section 41. For example, the part information acquisition section 42 acquires information such as body height, length of leg, length from hip joint to knee joint of leg, length from knee joint to heel of leg, length of arm, length from shoulder to elbow of arm, length from elbow to fingers, etc. At this point, as the information related to a part of the body, a thickness of the part (e.g., arm) may be acquired. The part information acquisition section 42 outputs the acquired information related to each body part of the user 13 to the reference 3D correction section 44.

The evaluation reference memory 43 stores the reference 3D model data that is the 3D model data of the reference movement (reference dance) which is a sample (evaluation reference) when an evaluation for the movements of the user 13 (in this case, it is dance) is performed. The exercise support system 11 of the present embodiment can evaluate plural types of dances. Therefore, the plural types of reference 3D model data are stored in the evaluation reference memory 43. The reference dances are made on the basis of a reference human body shape.

The reference 3D correction section 44 performs a body shape correction so as to approximate the reference human body shape, in which reference dances are performed, to the body shape of the user 13. That is, in this body shape correction, the length or the thickness of each part (leg, arm, etc.) of the reference body shape is adjusted based on the information related to each body part of the user 13 acquired by the part information acquisition section 42. For example, when the length of leg of the user is longer than the length of leg of the reference body shape, the length is extended until it becomes equal to the length of leg of the user.

Also, the reference 3D correction section 44 corrects the reference 3D model data to the data based on the reference body shape corrected by the body shape correction. The reference 3D model data after this correction corresponds to the data in the case that the human of the reference body shape after the body shape correction ideally performs a dance. The reference 3D correction section 44 outputs the reference 3D model data after the correction to the evaluation section 45.

The evaluation section 45 evaluates the dance performed by the user 13 based on the 3D model data inputted from the 3D generation section 41 and the reference 3D model data after the correction inputted from the reference 3D correction section 44. In the present embodiment, the evaluation section 45 extracts different points between the dance performed by the user and the reference dance in each body part, and the evaluation is performed based on the extracted result. Here, for example, a dance performed by the user 13 can be evaluated in the point of view of a movement timing, a position or a direction of a body part at any timing, a displacement velocity (including movement speed and rotation speed) when a body part displaces (including movement and rotation), a trajectory when a body part displaces, etc.

Movement Timing Delay

For example, in a case of a movement that the user raises right hand, when the timing in which the user 13 raises right hand is earlier or later than the timing of raising right hand in the reference dance, the occurrence of the deviation in the timing can be determined.

Position or Direction of Body Part at Any Timing

For example, when the left hand is positioned higher than the head in the reference dance and when the user's left hand is positioned lower than the head, the occurrence of the deviation in the left hand position can be determined. Also, when the face is directed toward right in the reference dance and when the user 13's face is directed toward front, the difference of the face direction can be determined.

Displacement Velocity When a Body Part Displaces

For example, in a case that the rotational movement of right hand is performed in a given direction, when the displacement velocity of the user 13's right hand is faster or slower than the displacement velocity of the right hand in the reference dance, the occurrence of the deviation in the displacement velocity of right hand can be determined.

Trajectory When a Body Part Displaces

For example, in a case that a rotational movement of right hand is performed in a given direction, when the displacement trajectory of the rotation of the user 13's right hand displaces from the displacement trajectory of the rotation of right hand in the reference dance, it is determined that the dance performed by the user 13 is different from the reference dance.

The evaluation section 45 outputs the 3D model data and the reference 3D model data with the evaluation result to the output control section 46. Further, the evaluation section 45 outputs the evaluation result to the guide section 47 and the update section 49.

The guide section 47 analyzes the evaluation result inputted from the evaluation section 45 and generates guide information which is the information related to the guide (advice) to approximate the dance performed by the user 13 to the reference dance, and the guide information is outputted to the output control section 46. For example, when the guide section 47 can determine that the user's right hand movement is different from the reference dance, the guide information "there is a recommendation to perform better dance if paying particular attention to the right hand movement" is generated and it is outputted.

The update section 49 updates contents stored in the history memory section 48 based on the evaluation result inputted from the evaluation section 45.

Figure 2B:
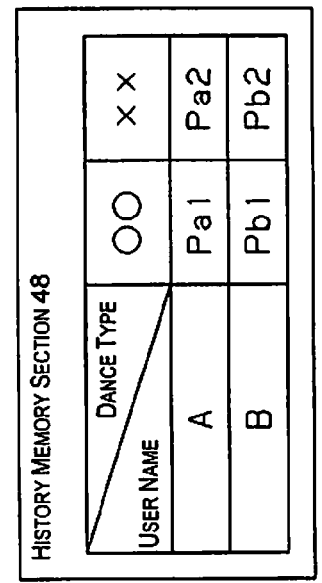
FIG. 2B is a diagram describing memory contents of a history memory section.

As shown in FIG. 2B, in the history memory section 48, the evaluation history when the user performs dances is stored in each type of dances. For example, the evaluation history when the user "A" performs the first dance "∘∘" is stored as "Pa1". Further, the evaluation history when the user "A" performs the second dance "xx" is stored as "Pa2". In the same manner, the evaluation history when the user "B" performs the first dance "∘∘" is stored as "Pb1", and the evaluation history when the user "B" performs the second dance "xx" is stored as "Pb2". The evaluation history includes the points of which the user easily and frequently made mistakes when the user performed the dances in the past.

That is, the update section 49 adds the points in which the user (e.g., "A") made mistakes in the dance (e.g., the first dance "∘∘") in this time to the related evaluation history (e.g., "Pa1").

Returning to FIG. 2A, the notification section 50 specifies the user who performs the dance in this time and the type of dance before the user 13 starts performing the dance. Next, the notification section 50 acquires the evaluation history ("Pa1" in this case) corresponding to the specified user (e.g., "A") and the type of dance (e.g., first dance "∘∘") from the history memory section 48. When the user 13 performs the dance, the notification section 50 executes a notification processing of which the information related to the points in which the user easily makes a difference from the reference dance when the user 13 performs the dance is outputted to the output device 30 appropriately. For example, at the first timing (e.g. at the time of which one minute has passed from the point that the user started performing the dance) while performing the dance, when the determination that the delay of the right hand movement easily occurs can be made from the evaluation history, the notification section 50 instructs the output device 30 to execute the guide such as "attention to the right hand movement" in a few seconds (e.g., 5 seconds before) before the first timing.

Here, as the points of the mistakes that were made when one user (e.g., "A") performed the first dance several times, it is not only the points of the mistakes that were made every time but also the mistake that was made only one time when the user performed the first dance several times. Then, the notification section 50 may notify the point of the mistake that was made only one time by one user, or may notify only the point of the mistakes that were made more than or equal to predetermined times (e.g., three times).

The output control section 46 includes a display control section 461 that controls the video output device 31 and an audio control section 462 that controls the audio output device 32. The display control section 461 displays an evaluation result, which is generated by the evaluation section 45, in the display control section 461 after the dance performed by the user was completed. That is, the display control section 461 outputs a video X1 (video that simulates the dance of the user) based on the 3D model data shown in FIG. 3A and a video X2 based on the reference 3D model data shown in FIG. 3B. At this point, the display control section 461 displays two videos X1, X2 with the evaluation result generated by the evaluation section 45. In FIG. 3A, the point P, which is the difference between the dance performed by the user 13 and the reference dance, is displayed in the manner of surrounding it by the broken line.

It is possible that a display mode in the video output device 31 is set by the user 13. For example, when the user 13 requests to display two videos X1, X2 side by side, the display control section 461 displays the video X1 shown in FIG. 3A and the video X2 shown in FIG. 3B side by side on the screen of the video output device 31. Further, when the user 13 requests to overlap the two videos X1, X2 and display it, as shown in FIG. 4, the display control section 461 displays it on the screen of the video output device 31 in a state that the two videos X1, X2 are overlapped. At this point, the display control section 461 performs a display control after performing a process of making any one of the two videos X1, X2 (e.g., video X2 based on the reference 3D model data) translucent.

Returning to FIG. 2A, the input processing section 51 processes a signal from a control section (not shown in the drawing) which is controlled by the user 13. For example, when a request related to an output mode in a case in which an evaluation result is outputted to the output device 30 is inputted as a signal, the input processing section 51 outputs the request to the output control section 46. Further, when one dance is selected from the plural types of available dances, the input processing section 51 outputs an instruction for acquiring the reference 3D model data of the selected one dance from the evaluation reference memory 43. Further, if it is determined any of the user (A or B), the input processing section 51 outputs an instruction for acquiring the evaluation history corresponding to the aforementioned selected one dance and user to the notification section 50.

Next, a processing routine that executes the exercise support apparatus 40 will be described in reference to the flowchart shown in FIG. 5.

Figure 5:
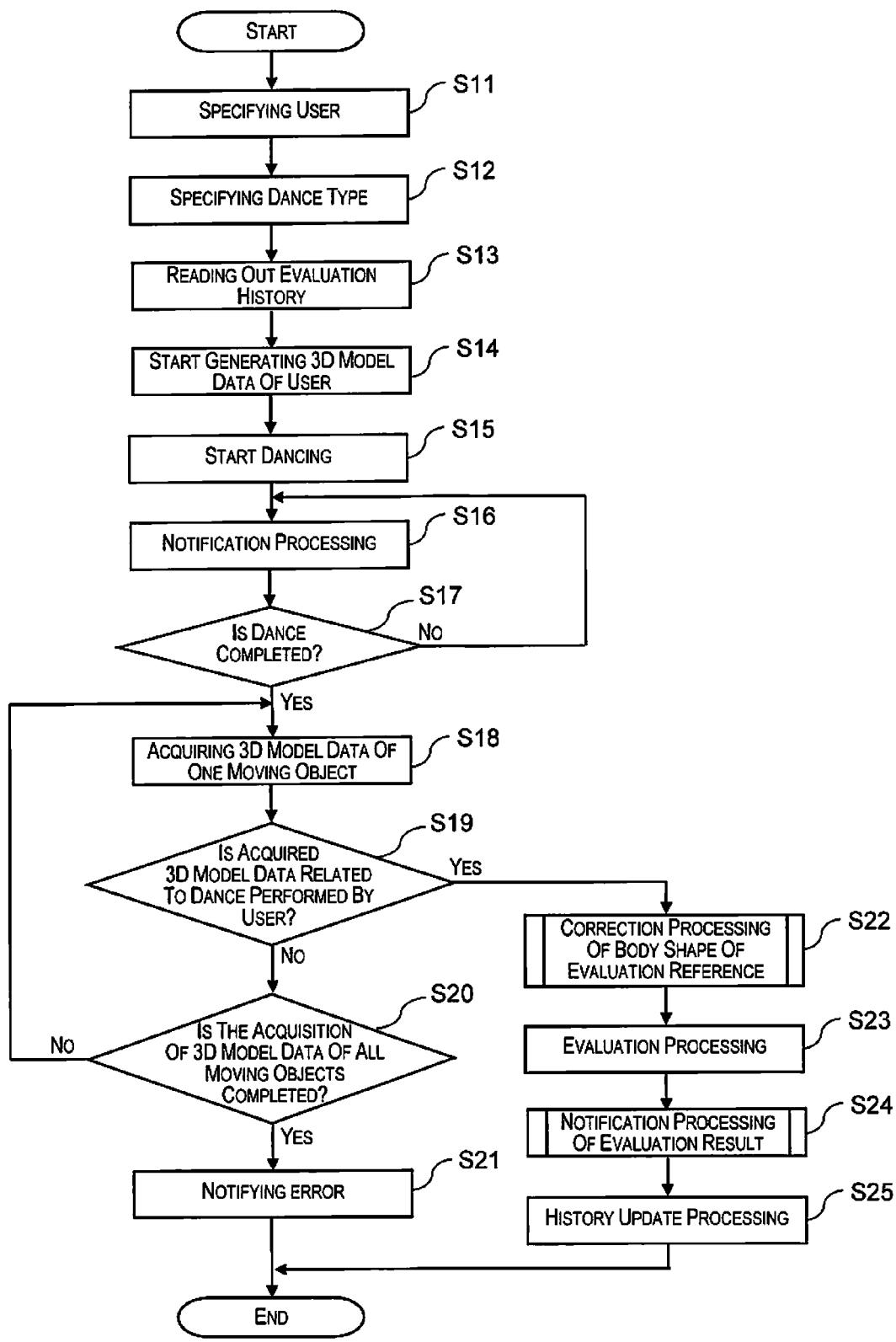
FIG. 5 is a flowchart describing a processing procedure when a dance performed by the user is evaluated.

As shown in FIG. 5, in Step S11, the input processing section 51 specifies the user 13 as an evaluation target at this time. Next, in Step S12, the input processing section 51 specifies the type of dance of which the user 13 performs. In Step S13, the notification section 50 reads out the evaluation history corresponding to the user and the type of dance specified by the input processing section 51 from the history memory section 48. Next, in Step S14, the 3D generation section 41 starts generating the 3D model data of the user 13 based on the video taken by each imaging device 20.

Next, in Step S15, the input processing section 51 instructs the user to start performing the dance (exercise). The audio control section 462 outputs the music corresponding to the specified dance from the audio output device 32. At this point, the display control section 461 reads out the reference 3D model data corresponding to the specified dance from the evaluation reference memory 43, and the video X2 based on the reference 3D model data may be displayed in the video output device 31.

In Step S16 while performing the dance, the notification section 50 executes the aforementioned notification processing. In this case, before the user 13 who performs the dance starts the movement that was previously made mistake, the display control section 461 outputs the message (e.g., "attention to the right hand movement") that alerts the attention to the user 13 from the video output device 31. There is a case that the audio control section 462 may output the message from the audio output device 32.

Next, in Step S17, the input processing section 51 determines whether or not the dance is completed. When the user is still performing the dance (Step S17: NO), the processing is shifted to the aforementioned Step S16. On the other hand, when the user completes performing the dance (Step S17: YES), the 3D generation section 41 completes generating the 3D model data of the user 13. The processing is shifted to next Step S18. That is, it performs generating the 3D model data of the user 13 from the point in which the processing of Step S15 was executed to the point in which the determination result of Step S17 is confirmed (YES). Therefore, in the present embodiment, in Step S15 to Step S17, the dance performed by the user 13 is taken by the plurality of imaging devices 20, and it corresponds to an example of the "3D generation step" in which the 3D model data of the user 13 is generated based on the video taken by each imaging device 20.

In Step S18, the 3D generation section 41 acquires the 3D model data of one moving object among the 3D model data of plurality of moving objects. Next, in Step S19, the 3D generation section 41 determines whether or not the acquired 3D model data of the moving object is the data related to the dance performed by the user 13, that is, the 3D model data of the user 13. For example, when there are all body parts corresponding to the body (head, both hands, both legs) in the videos based on the 3D model data, it is determined that the 3D model data is the data related to the dance performed by the user 13.

When it determines that the 3D model data is not the data related to the dance performed by the user 13 (Step S19: NO), the processing is shifted to Step 20. Next, in Step S20, the 3D generation section 41 determines whether or not the acquisition of the 3D model data of all generated moving objects is completed. When the acquisition of the 3D model data of all moving objects is completed, in the period of the dance performed by the user 13 at this time, it is determined that the generation of the data related to the dance performed by the user 13 was failed. In this case, the dance performed by the user 13 at this time cannot be evaluated.

Therefore, when the acquisition of the 3D model data of all moving objects has not been still completed (Step S20: NO), the processing is shifted to the aforementioned Step S18. In Step S18, among the 3D model data of the plurality of moving objects, the 3D model data of moving objects that have not been still acquired is newly acquired. On the other hand, when the acquisition of the 3D model data of all moving objects has been completed (Step S20: YES), the processing is shifted to next Step S21. In Step S21, the 3D generation section 41 outputs the data generation error to the input processing section 51, and the input processing section 51 executes an error processing. The display control section 461 outputs its message to the video output device 31, and the audio control section 462 outputs its message to the audio output device 32, and this processing is completed.

On the other hand, in Step S19, when it determines that the 3D model data of the moving object acquired in Step S18 is the data related to the dance performed by the user 13 (YES), the processing is shifted to next Step S22. Next, in Step S22, the correction processing of the body shape of the evaluation reference is executed by the part information acquisition section 42 and the reference 3D correction section 44. This correction processing procedure will be described later in reference to FIG. 6. Next, in Step S23, the evaluation section 45 executes the evaluation processing that evaluates the dance performed by the user 13 at this time. In this evaluation processing, the dance performed by the user 13 is evaluated by comparing between the reference 3D model data, which becomes the evaluation reference of the dance, and the 3D model data of the user 13 in each body part of the user 13. Therefore, in the present embodiment, Step S23 corresponds to an example of "evaluation step".

In Step S24, the output control section 46 executes the notification processing that notifies the evaluation result by the evaluation section 45. The notification processing of this evaluation result will be described later in reference to FIG. 7. Next, in Step S25, the update section 49 executes a history update processing that updates contents stored in the history memory section 48 based on the evaluation results generated by the evaluation section 45 and, after that, this processing is completed.

After this processing was completed, the guide section 47 generates the aforementioned guide information and outputs it to the output control section 46. The output control section 46 controls the video output device 31 and the audio output device 32 to output an advice, which is used for approximating the dance performed by the user 13 to the reference dance.

Next, the correction processing of the body shape of the evaluation reference in the aforementioned Step S22 will be described in reference to the flowchart shown in FIG. 6.

Figure 6:
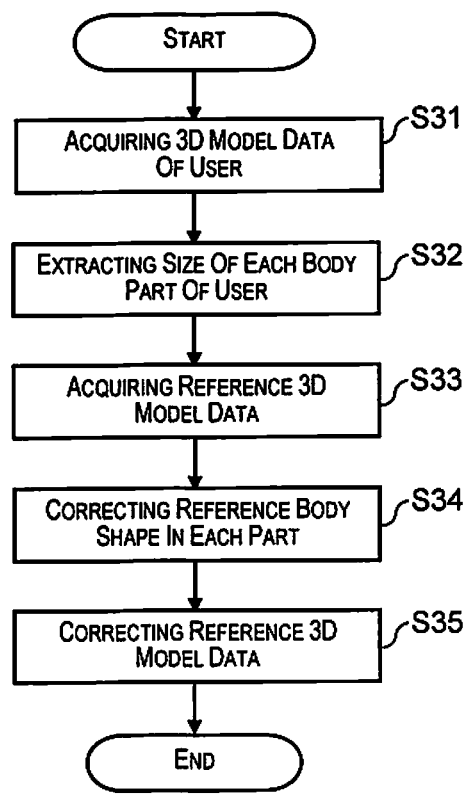
FIG. 6 is a flowchart describing a processing procedure when a reference body shape is corrected.

As shown in FIG. 6, in Step S31, the part information acquisition section 42 acquires the 3D model data of the user 13 from the 3D generation section 41. Next, in Step S32, the part information acquisition section 42 extracts the size (length, thickness, etc.) of each body part of the user 13, and outputs the extracted information related to each part of the user 13 to the reference 3D correction section 44.

In Step S33, the reference 3D correction section 44 acquires the reference 3D model data corresponding to the type of dance at this time from the evaluation reference memory 43. Next, in Step S34, the reference 3D correction section 44 performs the body shape correction that approximates the reference body shape to the body shape of the user 13. In Step S35, the reference 3D correction section 44 corrects the reference 3D model data based on the reference body shape after the body shape correction, and outputs the reference 3D model data after the correction to the evaluation section 45. After that, this processing is completed.

The notification processing of the evaluation result in the aforementioned Step S24 will be described in reference to the flowchart shown in FIG. 7.

Figure 7:
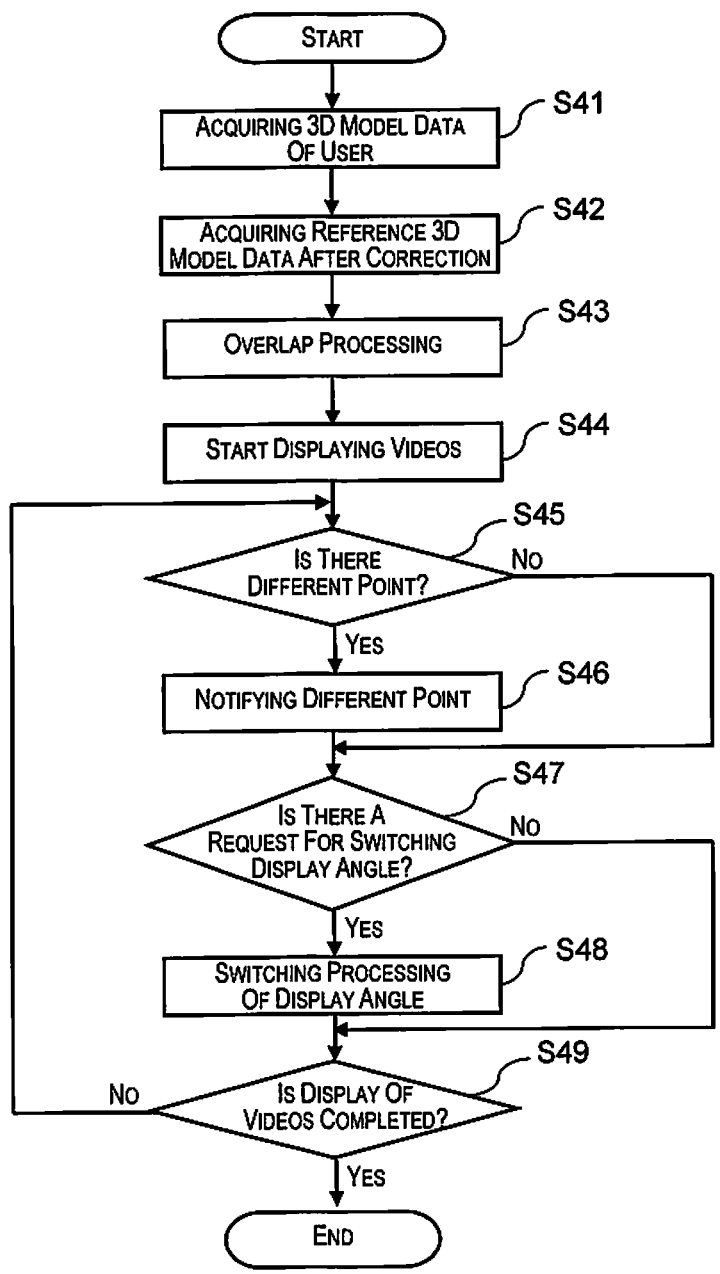
FIG. 7 is a flowchart describing a processing procedure when an evaluation result is notified.

As shown in FIG. 7, in Step S41, the display control section 461 acquires the 3D model data of the user 13 from the evaluation section 45. Next, in Step S42, the display control section 461 acquires the reference 3D model data after the correction from the evaluation section 45. In Step S43, the display control section 461 executes the overlapping processing that overlaps the video X1 based on the 3D model data of the user and the video X2 based on the reference 3D model data. At this point, the display control section 461 also executes the image processing in which the video X2 based on the reference 3D model data becomes translucent.

Next, in Step S44, the display control section 461 starts outputting the videos in the video output device 31. At this point, the audio control section 462 may output the music, which is outputted when the user 13 performs the dance at this time, from the audio output device 32.

Next, in Step S45, while displaying the videos in the video output device 31, the display control section 461 determines whether or not there is a different point between the dance performed by the user 13 and the reference dance. When there is a different point (Step S45: YES), the processing is shifted to Step S46. In Step S46, the display control section 461 notifies the different point. In this case, in the display screen of the video output device 31, the different point is emphatically displayed (see FIG. 4). Also, a message (e.g., "right hand flexes") indicating the different point between the dance performed by the user 13 and the reference dance may be displayed on a display screen. In addition, the audio control section 462 may output a message that points out the difference between the dance performed by the user 13 and the reference dance as voice from the audio output device 32. After that, the processing is shifted to next Step S47.

On the other hand, when there is no different point between the dance performed by the user 13 and the reference dance (Step S45: NO), the processing of Step S46 is not executed, and the processing is shifted to next Step S47.

In Step S47, the display control section 461 determines whether or not there is a request for switching a display angle of the video from the input processing section 51. When there is no switching request (Step S47: NO), the processing of Step S48 is not executed and the processing is shifted to Step S49. On the other hand, when there is a switching request (Step S47: YES), the processing is shifted to next Step S48. In Step S48, the display control section 461 executes the processing for switching the display angle of the video in the display screen of the video output device 31. The processing is shifted to next Step S49.

There is a case that the user requests an enlarged display or a reduced display by controlling a controller. In this case, the request of the enlarged display or the reduced display is inputted from the input processing section 51. The display control section 461 enlarges or reduces the videos in the magnification corresponding to the request.

In Step S49, the display control section 461 determines whether or not the display of videos is completed. When the display of videos has not been completed yet (Step S49: NO), the processing is shifted to the aforementioned Step S45 because the determination of which the notification of the evaluation result has not been completed yet can be made. On the other hand, when the display of videos has been completed (Step S49: YES), this processing is completed because the determination of which the notification of the evaluation result has been completed can be made.

According to the aforementioned embodiment, the following effects can be obtained.

(1) The 3D model data of the user 13 is generated by taking videos of the dance performed by the user 13 by the plurality of imaging devices 20. A comparison between the 3D model data and the reference 3D model data in each body part (hand or leg) of the user 13 is performed so that the "evaluation of the user 13's movement", in which the reference dance is standardized, can be performed in each body part. Accordingly, it is possible to appropriately evaluate whether the movement in any body part of the user 13 is different from the reference dance as a sample, etc. Therefore, the evaluation accuracy of the dance performed by the user 13 can be enhanced.

(2) In the present embodiment, the body shape correction is performed to approximate the reference body shape to the body shape of the user 13, and the reference 3D model data based on the reference body shape after the correction is generated. The variability of the evaluation accuracy caused by the physical difference between the user 13 and the reference body shape can be suppressed by employing the reference 3D model data after such correction as an evaluation reference and therefore, the evaluation accuracy of the user 13 can be enhanced.

Further, the information related to each body part of the user 13 is acquired based on the three-dimensional video. Accordingly, the information related to each body part of the user 13 can be accurately acquired in comparison with the case that the information related to each body part of the user 13 is acquired based on two-dimensional video. Therefore, the reference body shape can be accurately corrected.

In addition, the memory capacity of the evaluation reference memory 43 can be reduced in comparison with the case that the reference 3D model data based on various body shapes is preliminary prepared for evaluating the dance performed by the user 13 with any body shape.

(3) Further, after the notification of the evaluation result, an advice for approximating the dance performed by the user 13 to the reference dance can be sent based on the evaluation result. Therefore, this can be used for the improvement of the future dance technique.

(4) Further, when the evaluation result is notified to the user 13, the video X1 based on the 3D model data of the user 13 and the video X2 based on the reference 3D model data are displayed in the display screen of the video output device 31. Therefore, the user 13 can compare between own dance and the reference dance and can appropriately understand which movement of the body part is different from the reference dance.

(5) In the present embodiment, the video X1 based on the 3D model data of the user 13 and the video X2 based on the reference 3D model data can be overlapped and displayed in the display screen of the video output device 31. By displaying such videos, the user 13 can clearly understand the difference between the own dance and the reference dance.

(6) In the present embodiment, the evaluation result is memorized as an evaluation history in the history memory section 48. At the time of the next or later dance performed by the user 13, the point in which the user 13 easily makes mistakes can be notified while dancing. Therefore, the improvement of the dance technique of the user 13 can be appropriately supported.

(7) In the present embodiment, the 3D model data is generated so that the evaluation of the dance performed by the user 113 viewed from various directions can be performed. Even when the video X1 based on the 3D model data of the user and the video X2 based on the reference 3D model data output to the video output device 31, a video in an angle that the user 13 desires can be provided to the user 13.

The aforementioned embodiment can be changed into the following embodiment.

In the aforementioned embodiment, the advice is made while the user 13 performs the dance based on the evaluation history stored in the history memory section 48, but the advice may be made before the user 13 performs the dance. In this case, the dance performed by the user 13 can be appropriately supported.

Advice may not be made based on the evaluation history.

In a case that the video X1 based on the 3D model data of the user 13 and the video X2 based on the reference 3D model data are overlapped and displayed, the video X1 based on the 3D model data of the user 13 may be made translucent instead of the video X2, and the two videos X1, X2 may be overlapped and displayed in the video output device 31.

The video X1 based on the 3D model data of the user 13 and the video X2 based on the reference 3D model data may not be overlapped and displayed. Further, in a case that the evaluation result is notified to the user 13, the video X2 based on the reference 3D model data may be displayed in the video output device 31.

After the notification of the evaluation result, an advice based on the evaluation result may not be made.

In a case that the evaluation result of the dance performed by the user 13 is notified by the video, an editing processing that collects different points between the dance performed by the user 13 and the reference dance is performed, and the parts edited by this editing processing may be outputted as digest.

The evaluation result of the dance performed by the user 13 may be notified by voice instead of notifying by the videos.

The evaluation result of the dance performed by the user 13 may be provided as a score and the score may be notified to the user 13.

The information related to each body part of the user 13 may be acquired before the user 13 starts performing the dance. In this case, the body shape correction that approximates the reference body shape to the body shape of the user 13 can be performed before the user starts performing the dance. Therefore, the videos based on the reference 3D model data after the correction may be outputted to the video output device 31 while the user 13 is performing the dance.

In the aforementioned embodiment, the reference body shape is automatically corrected, but the user 13 may correct the reference body shape by manual control. For example, the characteristics (e.g., body height, gender, age, weight) related to the body shape of the user 13 are inputted by the user 13, and the reference body shape may be corrected based on the result of the input.

The correction of the reference body shape may be omitted.

In the aforementioned embodiment, the dance performed by the user 13 is evaluated after the user 13 completes performing the dance, but taking videos of the dance performed by the user 13 and the evaluation may be performed at the same time. For example, a period in which the user performs the dance is divided in a regular interval, and the dance performed by the user 13 in the N-th period may be evaluated at the time of the N+1-th period. Further, the dance performed by the user 13 may be evaluated by using only the dance performed by the user 13 in an immediate predetermined period.

In the aforementioned embodiment, it describes in a case that the dance performed by the user 13 is evaluated, but the exercise support system may be realized in the system for evaluating other exercises other than dances. For example, the exercises of the user 13 in a case of swinging a golf club or a baseball bat may be evaluated. In this case, the 3D model data of the moving object in which the user 13 and the equipment gripped by the user 13 are counted as one moving object is preferably generated.

Further, the exercise support system may be realized in the system to learn playing musical instruments or to learn cooking, etc. for the user 13, or may be realized in the system to support diet or rehabilitation for the user 13.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An exercise support system comprising:
   a plurality of imaging devices configured to capture videos for movements of a person to be evaluated;
   a microcomputer configured to generate 3D model data of the person to be evaluated based on the video captured by each of the imaging devices; and
   an evaluation reference memory configured to store reference 3D model data that is 3D model data to become an evaluation reference of an exercise,
   the microcomputer being further configured to
      perform an evaluation of the movements of the person to be evaluated by comparing between the reference 3D model data and the 3D model data that is generated, in each body part of the person to be evaluated,
      acquire information related to the each body part of the person to be evaluated in each part based on the 3D model data that is generated, and
      approximate a reference body shape to a body shape of the person to be evaluated based on the information and correct the reference 3D model data to data based on the reference body shape,
   the microcomputer being further configured to perform the evaluation of the movements of the person to be evaluated by comparing between the reference 3D model data corrected based on the reference body shape and the 3D model data that is generated, in the each body part of the person to be evaluated.

2. The exercise support system according to claim 1, wherein
   the microcomputer is further configured to guide the movements of the person to be evaluated such that the movements of the person to be evaluated approximates movements of the evaluation reference shown by the reference 3D model data based on an evaluation result of the evaluation after the evaluation has been completed.

3. The exercise support system according to claim 1, wherein
   the microcomputer is further configured to display movements of the evaluation reference shown by the reference 3D model data and the movements of the person to be evaluated shown by the 3D model data that is generated on a display screen.

4. The exercise support system according to claim 3, wherein
   the microcomputer is configured to overlap and display the movements of the evaluation reference shown by the reference 3D model data and the movements of the person to be evaluated shown by the 3D model data that is generated on the display screen.

5. The exercise support system according to claim 1, wherein
   the microcomputer is further configured to store an evaluation result of the evaluation section as an evaluation history, and configured to extract a movement of the person to be evaluated, which has been evaluated as being different from a movement of the evaluation reference shown by the reference 3D model data, based on the evaluation history, and notify the movement extracted based on the evaluation history before the movements by the person to be evaluated are started or while the movements are performed by the person to be evaluated.

6. The exercise support system according to claim 1, wherein
the microcomputer is configured to evaluate at least one of a delay movement of the person to be evaluated with respect to movements of the evaluation reference and a difference between a movement of a part as the evaluation reference and a movement of a part of the person to be evaluated.

7. An exercise support apparatus comprising:
a microcomputer configured to generate 3D model data of a person to be evaluated based on videos captured by a plurality of imaging devices configured to capture the videos for movements of the person to be evaluated; and
an evaluation reference memory configured to store reference 3D model data that is 3D model data to become an evaluation reference of an exercise,
the microcomputer being further configured to
evaluate the movements of the person to be evaluated by comparing the reference 3D model data and the 3D model data that is generated in each body part of the person to be evaluated,
acquire information related to the each body part of the person to be evaluated in each part based on the 3D model data that is generated, and
approximate a reference body shape to a body shape of the person to be evaluated based on the information and correct the reference 3D model data to data based on the reference body shape,
the microcomputer being configured to evaluate the movements of the person to be evaluated by comparing between the reference 3D model data corrected based on the reference body shape and the 3D model data that is generated, in the each body part of the person to be evaluated.

8. A method for supporting an exercise comprising:
capturing videos for movements of a person to be evaluated by a plurality of imaging devices and generating 3D model data of the person to be evaluated based on the video captured by each of the imaging devices;
evaluating the movements of the person to be evaluated by comparing reference 3D model data that is 3D model data to become an evaluation reference of an exercise and the 3D model data that is generated in each body part of the person to be evaluated;
acquire information related to the each body part of the person to be evaluated in each part based on the 3D model data that is generated; and
approximate a reference body shape to a body shape of the person to be evaluated based on the information and correct the reference 3D model data to data based on the reference body shape,
the evaluating of the movements of the person to be evaluated including evaluating the movements of the person to be evaluated by comparing between the reference 3D model data corrected based on the reference body shape and the 3D model data that is generated, in the each body part of the person to be evaluated.

* * * * *